Feb. 13, 1951 P. E. ZIEGLER 2,541,565
AIRFOIL AND SLAT ASSEMBLY
Filed March 30, 1946
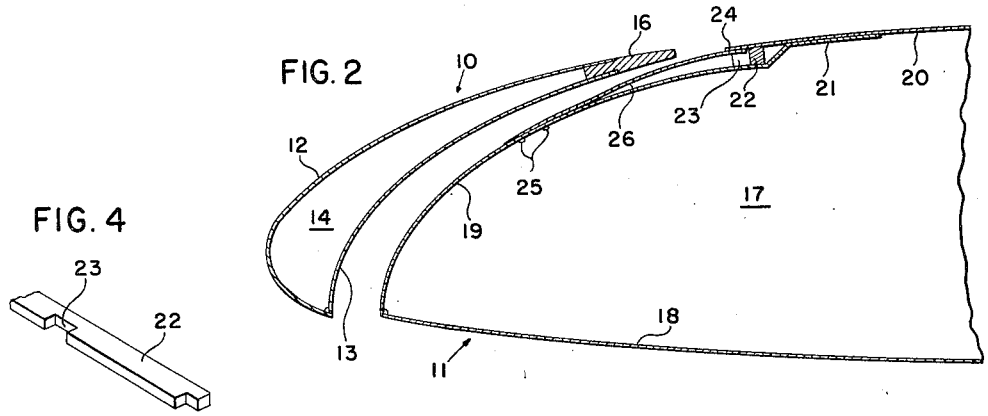
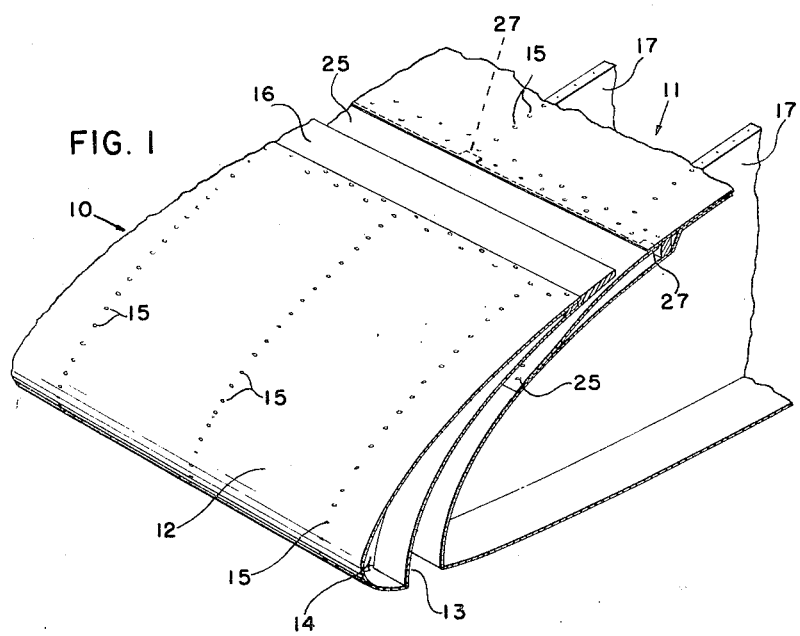
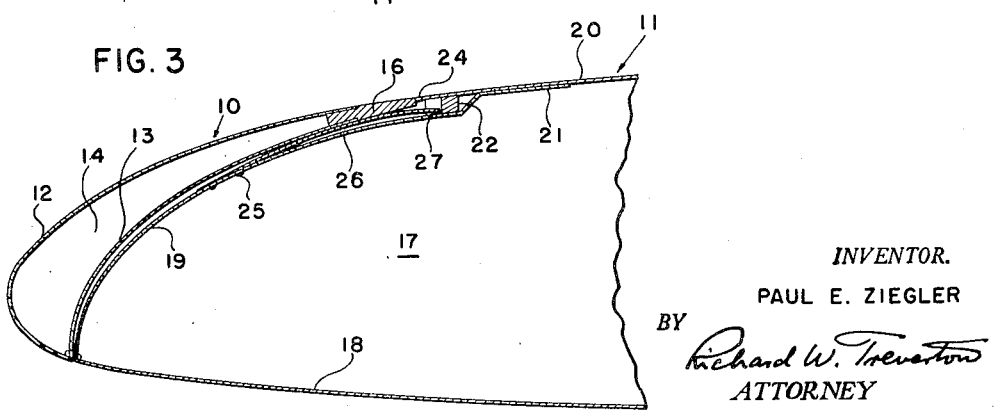
INVENTOR.
PAUL E. ZIEGLER
BY
Richard W. Treverton
ATTORNEY Patented Feb. 13, 1951

2,541,565

UNITED STATES PATENT OFFICE 2,541,565

AIRFOIL AND SLAT ASSEMBLY

Paul E. Ziegler, Columbus, Ohio, assignor to Curtiss-Wright Corporation, a corporation of Delaware Application March 30, 1946, Serial No. 658,387

6 Claims. (Cl. 244—42)

This invention relates to aircraft and more particularly to means for reducing aerodynamic disturbances occurring when certain normally closed parts of an airfoil assembly are moved into a relatively separated or open position.

It is common practice, for example, to provide the wing assembly of an aircraft with an auxiliary airfoil or slat which normally seats upon the leading edge of the main airfoil and is adapted to move or be moved forwardly thereof under certain conditions to provide a slot between the main airfoil and the slat. It is desirable to have the abutting surfaces of the main airfoil and slat of complementary shape, so that the exterior surfaces of the assembly will be of smooth contour when the slot is closed. As structural considerations usually require the trailing edge of the slat to have substantial thickness, the contour of the abutted surface of the main airfoil, which is exposed to the air stream when the slot is in open or extended position, has been irregular, creating drag producing aerodynamic disturbances.

The primary objective of the present invention is to reduce the drag upon the aircraft by eliminating such irregularity in the abutted surface of the main airfoil, while at the same time providing a suitable recess for the trailing edge of the auxiliary airfoil in order that the adjoining surfaces of these elements may be flush and present a smooth contour when the airfoils are in closed relation. This is accomplished by provision of a closure for such recess which presents a substantially smooth contour for air flowing over the airfoil surfaces when the latter are in open relation and which is displaceable into the recess to allow proper seating of the airfoils in their closed relation. Further objects reside in providing recess and closure means of the character described which are light in weight, simple of construction, and are operable automatically upon relative movement of the airfoils between their closed and opened positions.

The foregoing and other objects and advantages of the invention will become apparent from the following description of the typical embodiment shown in the accompanying drawings, wherein:

Fig. 1 is a view in perspective of a fragment of a main airfoil and slat assembly, with the slat in partially open or extended position;

Figs. 2 and 3 are fragmentary cross-sectional views of the structure, showing the slat in partially open and closed positions, respectively; and Fig. 4 is a fragmentary perspective view of a spacer element employed in the construction.

As shown in the drawings an auxiliary airfoil or slat 10 may be provided adjacent the leading edge or nose section of a main airfoil 11. The slat may comprise upper and lower surfaces 12 and 13 secured to spaced ribs 14 by any suitable means indicated at 15, and joined at their rearward edges by trailing edge strip 16. While the strip 16 decreases in thickness between its forward and rearward edges, its thickness at the latter edge may necessarily be substantial in order to provide sufficient strength and rigidity.

The main airfoil 11 is shown as comprising spaced ribs 17 to which are secured by means 15 a bottom skin section 18, an upper forward or nose skin section 19 and a rearward skin section 20, the latter two sections being secured to the ribs in juxtaposed relation as indicated at 21. A spacer bar 22 having spaced notches 23 in its forward edge is secured between skin sections 19 and 20 forwardly of 21, with the forward edge of section 20 overlying the notches 23 and, as indicated at 24, slightly overhanging the fore edge of the member 22.

Secured by any suitable means 25 to the nose skin section 19 is a flexible strip 26, preferably formed of resilient sheet metal. The rearward edge of the strip underlies the overhanging edge 24 and is provided with extensions 27 entered into notches 23 of the spacer member.

The slat 10 may be moved forwardly relative to main airfoil 11 between open or extended position, and rearwardly into seated relation upon the main airfoil, by reason of any suitable operating connections between these parts, such connections not being shown in the drawings as they are not a part of the present invention. In a partially open position, as shown in Figs. 1 and 2, and in further opened positions, the strip 26 is held by its inherent resiliency with its rearward edge portion in contact with overhanging edge portion 24 of the rearward skin section 20, and with the extensions 27 in contact with the skin above notches 23. It will be seen that the overhanging edge portion 24 and skin of section 20 above notches 23 constitute stop means which limit outward flexure of the strip substantially to the position thereof shown in Figure 2.

Reduced static pressure above the strip, resulting from the flow of air through the slot between surfaces 13 and 19 may also cause the strip to be pressed outwardly, and in the event such outward pressure should reach such magnitude as to so bow the strip that its rearward edge is advanced beyond the overhanging part 24, the extensions 27 will continue to function as stop means to prevent outward movement of the strip beyond the position shown.

In moving to the retracted or closed position of the parts, shown in Fig. 3, the slat 10 will press the strip 26 inwardly, the latter yielding sufficiently so that the slat may nest against the main airfoil, with its trailing edge abutted against the forward edge of skin section 20 and its upper surface in flush relation to the outer surface of that section.

It will thus be seen that the spacing of skin sections 19 and 20 by means 22 provides a recess in the nose section of the main airfoil for receiving the trailing edge of the slat when the latter is in the closed position; and that such recess is automatically covered by the strip 26 in an extended or open position. In the latter case the recess closure strip constitutes a continuation of the nose skin section whose contour merges smoothly into that rearward skin section 20, except for the off-set resulting from the skin thickness of the latter section. As very light gauge metal is employed, such off-set is insignificant, but if desired it may be avoided by forming a suitably depression in the upper surface of strip 26 at the edge thereof which underlies the overhang 24.

It will be understood that the arrangement and structure specifically shown and described is merely illustrative of the inventive principles involved, and that these may be otherwise embodied without departing from the spirit of the invention or the scope of the appended claims.

1. In an airfoil and slat assembly, the slat being arranged when closed to seat upon the nose of the airfoil with its trailing edge portion overlying the upper forward surface of the airfoil and with the upper surface of said trailing edge portion substantially flush with the upper surface of the airfoil aft of the slat, said upper forward surface of the airfoil comprising a resilient strip secured at its forward edge to the body of the airfoil, stop means for limiting outward flexure of said strip to a position wherein its rear edge portion is adjacent said upper aft surface of the airfoil whereby when the slat is open a substantially continuous surface is presented to air flowing over the airfoil from the slot between the slat and the airfoil, said strip being flexed away from said stop means to displace said rear edge portion thereof inwardly from said upper aft surface of the airfoil upon closing of the slat for providing a recess in the airfoil to accommodate the thickness of the trailing edge portion of the slat.

2. In an airfoil and slat assembly, an airfoil body having a nose skin section and a rearward skin section separated to provide a recess overhung by the rearward skin section, a closure associated with the nose skin section and having a rearward edge portion underlying the overhung portion of the rearward skin section, and a slat adjacent the leading edge of the airfoil body and movable into open and closed relations thereto, the closure being movable inwardly to permit the trailing edge of the slat to be received in the recess when the slat is in said closed relation and being movable outwardly against the overhung portion of the rearward skin section to close the recess when the slat is in said open relation.

3. In an airfoil and slat assembly, an airfoil body having a nose skin section and a rearward skin section separated by a spacer member to provide a recess, said spacer member having notches at its forward edge underlying the rearward skin section, a closure associated with the nose skin section and having at its rearward edge portions extending into said notches of the spacer member, and a slat adjacent the leading edge of the airfoil body and movable into open and closed relations thereto, the closure being movable inwardly to permit the trailing edge of the slat to be received in the recess when the slat is in said closed relation and being movable outwardly against the rearward skin section to close the recess when the slat is in said open relation.

4. In an airfoil and slat assembly, an airfoil having a recess in the nose portion thereof, a flexible strip secured at its forward edge to said nose portion and extending over said recess, means for limiting outward flexure of the strip into a position substantially flush with the surface of the airfoil at the rear of said recess, and a slat adjacent said nose portion of the airfoil and movable into open and closed relations thereto, said strip being yieldable inwardly into the recess to permit the trailing edge of the slat to be received in the recess when the slat is in said closed relation and flexing outwardly to the limit position permitted by said means when the slat is in said open relation.

5. In an airfoil and slat assembly, an airfoil having a recess in the nose portion thereof, a flexible strip secured at its forward edge to said nose portion and extending rearwardly over said recess, and a slat adjacent said nose portion of the airfoil and movable into open and closed relations thereto, said strip being yieldable into the recess to permit the trailing edge of the slat to be received in the recess when the slat is in said closed relation and flexing outwardly to provide a closure for the recess when the slat is in said open relation.

6. In an airfoil and slat assembly, an airfoil body having a nose skin section and a rearward skin section separated by a spacer member to provide a recess, said spacer member having notches at its forward edge and the rearward skin section having an edge portion forwardly overhanging the spacer member, a flexible closure strip secured at its forward edge to the nose skin section, the rearward edge of the closure strip underlying the overhanging portion of the rearward skin section and having portions extending into the notches of the spacer member, and a slat adjacent the leading edge of the airfoil body and movable into open and closed relations thereto, the closure strip being yieldable inwardly to permit the trailing edge of the slat to be received in the recess when the slat is in said closed relation and flexing outwardly against said overhanging portion of the rearward skin section to close the recess when the slat is in said open relation.

PAUL E. ZIEGLER.

REFERENCES CITED

The following references are of record in the file of this patent:

UNITED STATES PATENTS

| Number | Name | Date |
|---|---|---|
| 1,306,768 | Martin | June 17, 1919 |
| 1,800,746 | Page | Apr. 14, 1931 |
| 2,011,253 | Nightingale | Aug. 13, 1935 |
| 2,129,824 | DeSeversky | Sept. 13, 1938 |
| 2,186,221 | Weymouth | Jan. 9, 1940 |
| 2,381,680 | Maxwell | Aug. 7, 1945 |
| 2,407,185 | Stalker | Sept. 3, 1946 |